United States Patent
Swartz et al.

[19]

[11] Patent Number: 6,048,563
[45] Date of Patent: *Apr. 11, 2000

[54] REDUCED VISCOSITY, LOW ASH MODIFIED GUAR AND PROCESS FOR PRODUCING SAME

[75] Inventors: William Ewing Swartz, Cranbury; Craig Alan Hoppe, Plainsboro; James Thomas Elfstrum, Cranbury, all of N.J.

[73] Assignee: Rhodia Inc., Cranbury, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/034,057

[22] Filed: Mar. 3, 1998

Related U.S. Application Data

[63] Continuation-in-part of application No. 08/360,487, Dec. 21, 1994, abandoned.

[51] Int. Cl.[7] .................................................. A23L 1/0526
[52] U.S. Cl. ............................ 426/573; 426/575; 426/589; 536/114
[58] Field of Search ............................ 426/573, 575, 426/582, 589; 536/114

[56] References Cited

U.S. PATENT DOCUMENTS

| | | | |
|---|---|---|---|
| 2,086,701 | 7/1937 | Dreyfus | 127/37 |
| 2,393,095 | 1/1946 | Fetzer | 127/40 |
| 2,553,485 | 5/1951 | Swanson | 260/209 |
| 2,767,167 | 10/1956 | Opie et al. | 260/209 |
| 4,269,975 | 5/1981 | Rutenberg et al. | 536/114 |
| 4,315,918 | 2/1982 | Gayst et al. | 424/177 |
| 4,320,226 | 3/1982 | Tiefenthaler et al. | 536/114 |
| 4,659,811 | 4/1987 | Wu | 536/114 |
| 5,192,569 | 3/1993 | McGinley et al. | 426/96 |
| 5,273,767 | 12/1993 | Burgum | 426/240 |
| 5,296,245 | 3/1994 | Clarke et al. | 426/49 |

FOREIGN PATENT DOCUMENTS

| | | |
|---|---|---|
| 906327 | 9/1962 | United Kingdom . |
| WO 93/10156 | 5/1993 | WIPO . |
| WO 93/15116 | 8/1993 | WIPO . |

OTHER PUBLICATIONS

Food Chemicals Codex 3 Ed. (1981) pp. 141, 466.

*Primary Examiner*—Lien Tran
*Attorney, Agent, or Firm*—Andrew M. Solomon; John A. Shedden

[57] ABSTRACT

Functionally modified guar products are provided, particularly for food grade applications, which are characterized by reduced viscosity, low ash and high fiber content, and are prepared by a high shear treatment under acid conditions at elevated temperature.

14 Claims, 1 Drawing Sheet

EFFECT OF ACID ON GUAR MODIFICATION

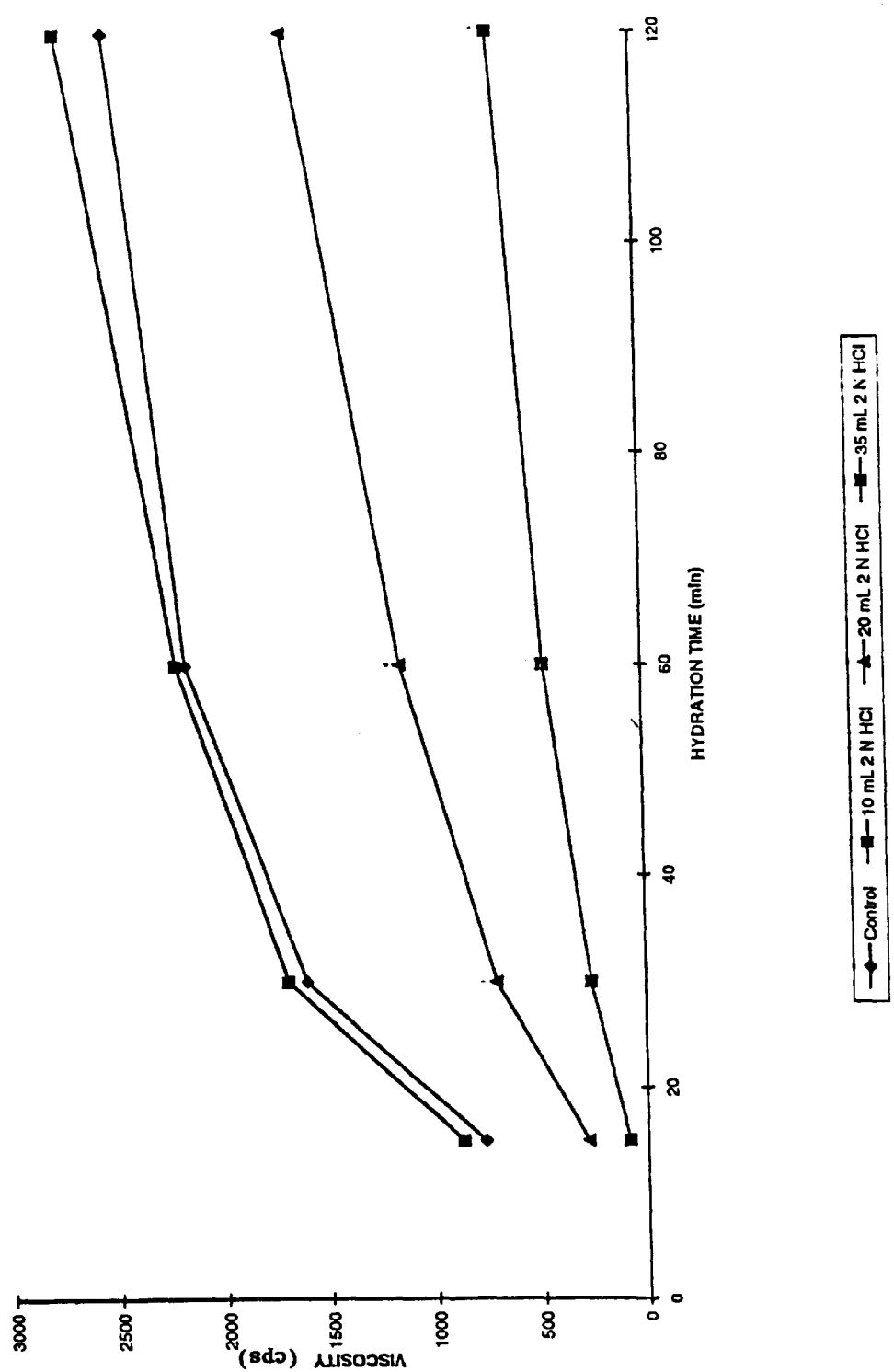

REDUCED VISCOSITY, LOW ASH MODIFIED GUAR AND PROCESS FOR PRODUCING SAME

This Application is a Continuation-in-Part of application No. 08/360,487 filed Dec. 21, 1994, now abandoned.

FIELD OF THE INVENTION

This invention relates to the provision of functionally modified guar products and their use, particularly in food grade applications. More particularly, there is described a semi-continuous process for the treatment of guar particulate to provide a relatively homogeneous, uniform, stable product for application in the food industry, providing in aqueous solution a reliable viscosity under controlled conditions capable of efficient conversion into processing aids, thickeners, binders, stabilizers and viscosity builders to augment food products such as sauces, salad dressings, cheeses and cheese products, providing reproducible texture and mouthfeel, among other desirable organoleptic properties. Moreover, the product as processed in accordance with the inventive principles more fully described herein is free of unacceptable ash levels providing a visually and functionally attractive adjunctive agent in food use, to aid in dispersion, gelation, moisture retention, preservation, stabilization or viscosity control. Additionally, the product provides a rich source of dietary fiber without excessive viscosity as is evidenced with normal, non-functionalized guar gum.

BACKGROUND OF THE INVENTION

Guar is derived from the endosperm of the leguminous plant *Cyamopsis tetragonolobus* (Linue) Taub or *Cyamopsis Psoraloides* (Lami) D. C. (Fam. Leguminosae).

It is a high molecular weight non-ionic hydrocolloidal polysaccharide, a galactomannan composed of galactose and mannose units. Guar seeds comprise a seed coat or hull, a pair of tough endosperm sections, referred to as 'guar splits', which contain the gum and the embryo. In processing, the hull is removed and the components separated by grinding, sifting and screening in one or more stages. The splits are ground and processed to provide a gum or gum precursor.

The splits may be processed to recover components thereof which may include all membrane, inorganic salts, and the predominant galactomannan, polysaccharide as well as associated proteinaceous material and water insoluble gels. The extraction has typically been achieved by way of hydration and/or alkaline digestion or refining processes as represented by U.S. Pat. No. 4,269,975 to National Starch and Chemical Corporation and U.S. Pat. No. 4,659,811 to Henkel. In the former, a hydration/extrusion operation is said to provide a high viscosity, e.g. 5000 cps finely divided, moisturized guar gum which could be dried and ground for future use. The '811 patent (and cited references such as U.K. Patent No. 906,327) recites the use of an alkaline medium at elevated temperature to separate endosperm from embryo and residual husk. The patentee still employs upwards of 60 percent of water in the reaction mixture, and utilizes a pH above 12, with a minimum of 150 parts by weight of aqueous alkali. The resulting wet solids may be partially neutralized to a pH below about 11, e.g., pH 9 (Example 9).

Other industrial processes have refined natural guar splits with acid solutions, heating the mixture, and then neutralizing the acid with sodium hydroxide or another alkaline material. The resultant product is a functionally modified guar controlled primarily by the pH and time of heat processing. Neutralization by alkaline treatment has tended to result in a high ash content, variability and other characteristics inconsistent with food ingredient use. In these processes effects tend to be concentrated on the exterior portion of the endosperm leading to an irregular non-uniform product with differential levels of functional modification. The property of stringiness manifests itself in processed and dried guar gum products and presents difficulties in food applications where smoothness, slipperiness or greasiness are important qualities to achieve or retain. While modification with chemical processing may minimize this problem it is attended with the ready development of ash, rapidly approaching levels of 1.5% or more, unacceptable for food use.

It is accordingly desirable to provide a process for the refinement of natural guar products to afford a uniform, homogeneous particulate product capable of forming aqueous solutions, pastes and gums of consistent, stable and reliable low viscosity and ash contents below 1.5%, generally below 1.0% for use in food product compositions of enhanced aesthetic character including desirable thickening and smoothening properties with enhanced mouthfeel in addition to other favorable organoleptic properties.

BRIEF SUMMARY OF THE INVENTION

In accordance with the present invention, free-flowing particulate mechanically processed guar endosperm is subjected to aqueous processing under acidic conditions with minimal aqueous dilution and hence controlled, limited hydration and relatively high shear to produce a converted guar product of modified rheological characteristics.

More specifically, there is provided a functionally modified guar product for food use, comprising low ash, a shorter texture tan conventional guar products and exhibiting a novel low viscosity profile especially at about 1% concentration or less under conditions of conventional refrigeration ranging to mildly elevated temperatures in food compositions such as sauces, salad dressings and the like.

These desirable characteristics are achieved by subjecting free-flowing guar endosperm particulate to high shear refining under controlled conditions of acid hydration; the resulting product is then subjected to a heat treatment under static or stirred conditions. The acid refining is effected so to control the amount of water available for hydration relative to the concentration of guar, i.e., at relatively high solids level. The refining at high shear is maintained for a period of time sufficient to significantly reduce the viscosity of guar to levels in the range of 0 to 2,500 cps; preferably 0 to 1,500 cps; and most preferably 0–1,000 cps. Many uses are found that utilize the lower viscosities. The absolute acid level is relatively low in comparison to direct acid refining of whole hydrated guar splits as practiced in the art such that degradation leading to ash levels unacceptable in food use is controlled and minimized. Ever at relatively low acid levels it may nevertheless be desirable to provide a fully neutralized product, hence for this purpose reaction with alkali to effect neutralization may be employed to minimize salt levels.

BRIEF DESCRIPTION OF THE DRAWINGS

FIG. 1 (Effect of Acid on Guar Modification) is a plot of Viscosity (cps) as the abscissa and hydration time (minutes) evidencing change in rheological characteristic in accordance with the invention.

DETAILED DESCRIPTION OF THE INVENTION

The native guar may be simply purified, i.e., split with hull removed or dehulled and screened one or more times to remove detritus, and then ground to a particulate ranging from a coarse granular material to a fine powder. Coarser materials tend disperse more readily, whereas finer grinds are more rapidly hydrated.

The guar starting material employed is at least 66% galactomannan and exhibits compositional elements consistent with the Food Chemicals Codex 3d Ed. (1981), p.141 incorporated herein by reference; specifically after processing it contains no more ash than exceeds 1 to 1.5% by weight of tine guar. Course gums passing through a 40 mesh screen but minimally through a 100 mesh screen; and fine gums defined as those containing a predominance of particles passing through a 200 mesh screen, can be used to prepare a satisfactory product. It will be understood that sources of guar may be mixed such that a certain bimodal distribution may result, for example, where a coarse grind and fine powder are used together.

Guar gums of varying initial viscosity, reflective of variations in molecular weight, composition, and degree of branching are readily available, in the range of 1000 to 6000 cps measured as a 1% solution (Brookfield RVF viscometer, spindle 3 or 4, 20 rpm). While any guar gum starting material may be employed, Uniguar 40 available from Rhone Poulenc with a viscosity of 2000 cps or Dycol 4000 FC, also available from Rhone Poulenc with a typical viscosity of 4000 cps (both viscosities determined as a 1% w/w) solution using a Brookfield RVF viscometer (Spindle 3, 20 rpm) is preferred.

The guar is introduced to a high shear mixing zone containing or to which is added an aqueous acidic medium with or without alcohol. Preferably, acid with a limited amount of water with or without alcohol is gradually added to the guar under conditions of high shear agitation. The rate of addition may be empirically selected to minimize clumping or the formation of gummy particles and may be affected by the rate of shear or the advance of the material to be treated, all of which is easily determined by one skilled in the art.

By high shear mixing, it is intended to denote a mixing process in a contained zone including stirring under conditions to effect in adjacent zones of the substrate being worked the application of differential forces, (as, differential velocity) between said zones, which may be in laminar or turbulent flow. As is well known to those skilled in these arts, the differential forces may be effected by the geometry of the stirring blade, the clearance of the blade member with the container or fixed or moveable obstructions in the container and the velocity of the stirrer, and will naturally be affected by the temperature of the system relative to the viscosity characteristics of the stirred medium. Under conditions of high velocity, low clearances and/or high viscosity, "high shear" mixing by which is meant mixing in the range of from 1,000 to 10,000 reciprocal seconds is readily achieved.

The treatment regimen is selected to maintain a high solids system with minimum moisture level; in addition, the acid addition is adjusted to maintain pH yet avoid undesirable formation of ash from the action of excess acid. The moisture content of the guar during treatment with said acid is not in excess of 25 percent. For experimental purposes, a prototypical/batch system employed a Cuisinart food processor with the basic cutting blade providing high shear to the mixing zone containing about 500 grams of guar gum granulate and acid (2N HCl 1:6 dilution of 12N HCL in ethanol) was added at a rate of about 5 ml/min. to a total of 10 to 35 ml with continuous mixing; after the completion of acid addition, the system was agitated for another 10 to 15 seconds. Conditions for larger semi-continuous and continuous systems may be adapted consistently within the knowledge of one skilled in the art.

Thus, any high shear mixer may be utilized in an open or closed system under ambient conditions. Some increase in temperature as a consequence of the work performed will be experienced but generally normal heat dissipation is readily achieved without cooling. Any mineral acid may be utilized such as hydrochloric, sulfuric or nitric acid but hydrochloric is preferred for retention of favorable color; phosphoric acid or other food acceptable acids are naturally preferred for regulated applications. Generally a more concentrated acid source is desirable in the range of 2 to 3N but will depend in part on the amount of material being processed, and particle size. Preferably, the acid is added incrementally to the particulate guar in the presence of 1 to 15 parts by weight of water per 100 parts of guar. The guar particle size is usually between about 20 and about 400 mesh; preferably 80% of the guar has a particle size within the range of 80 to 200 mesh. Typically, from about 5 to about 10 parts of acid (calculated at 2N) are used per 100 parts by weight of guar. In selecting conditions it may be necessary to establish the level of acid sensitivity of the guar gum source and this may be readily accomplished by a test using different acid concentration, as shown in Example III.

In some instances (relative to source of guar) it has been found convenient to utilize a small amount of alkanol in concert with the acid addition. This is understood to act essentially as a wetting agent facilitating access to the guar surfaces. Ethanol was representatively employed but any non-toxic straight chain or branched $C_1$–$C_4$ alcohol could be used. For food grade products, the use of ethanol is most preferred.

The processed guar is then treated at an elevated temperature for a period of time to provide a product of selected viscosity when redispersed in an aqueous medium. Thus, the material may be heat treated in a circulating oven for a period of from one minute to several hours, preferably from about 5 minutes to about 3 hours, at a temperature of 30 to 180° C., preferably 50 to 130° C. The time of treatment will depend largely upon the nature of the native guar gum with longer treatment times usually associated with higher viscosity materials. Generally, it is preferred to avoid higher temperatures concomitant however with reasonable processing times.

Generally, treatment is continued for a period and under conditions to provide a product having a molecular weight of 20,000 to 500,000 and which when dried, then redispersed in ambient water at 1 percent concentration, will evidence a selected initial viscosity of from 0 to 2500 centipoise, preferably from 0 to 1500 cps; and most preferably from 0 to 1000 cps. It is often preferred to prepare a fully neutralized product and for this purpose one may employ an essentially equivalent amount of alkali to neutralize the residual acid. In the case of a batch operation and for ready and rapid processing, it can be convenient to use a high shear mixer to facilitate this step. As with the acid treatment gradual addition is preferable to control exposure of the product to the alkali. It has also been found preferable to utilize the alkali in the form of a caustic ethanolic solution.

To provide the most uniform product in batch operations, lag time to neutralization should be consistently maintained.

In some circumstances, the level of retained moisture may be excessive relative to storage or use conditions in which event a further convective drying step may be suitably employed.

It is an important aspect of the present invention that low ash levels are real zed in the resulting product; usually less than 1.5% by weight and most often below 1 percent. Ash levels of from 0.5 to 1.00% are easily obtained. Also significant is the viscosity profile of the product, that is, the controllable viscosity characteristic developed by varying the concentration over the range of about 0.75 to 1.5%, or by varying temperature of formulation from 90° C. to refrigeration storage conditions.

The functionally modified guar of the present invention may be used alone or with other gums such as locust bean gum, carrageenan, xanthan or tara gum, starch or gelatin in a wide variety of food products such as ice cream, pie fillings, icings and frostings, pet foods, frozen novelties, whipped toppings, sour cream and yogurt products, sauces, cream soups, salad dressings, cottage cheese dressings, egg substitutes and dipping batters. The product may also be derivatized where food acceptable substituents are employed. The compositions may employ food acceptable salts of mono-, di- or trivalent cations, preservatives such as sodium benzoate, citric acid or sorbic acid, or ion sequestering agent such as citric, tartaric or orthophosphoric acids. The product may be dried and stored then, when converted to gel or sol form by hydration in cold or warm water systems, the thixotropic viscous colloidal dispersion thus formed may be used directly in food compositions. The viscosity developed is somewhat shear sensitive at low concentration and is dependent on temperature, concentration, pH, ionic strength as well as the induced agitation. Viscosities may be measured by a rotational, shear type viscometer capillary viscometer at low concentrations and extrusion rheometers at higher concentrations. Typically viscosity is measured by a Brookfield RVT Viscometer (Brookfield Engineering Laboratories, Stoughton, Mass. 02072) at 20 rpm using spindle 3.

While the process according to the invention may be understood to achieve significant permanent cleavage of the native guar galactomannan as a result of the mechanical energy of the high shearing process alone, it is believed without limitation that the favorable characteristics attained in the resultant product both as to viscosity and shear related properties under different conditions and circumstances of use are also a consequence in part of a certain selectivity in hydrolytic cleavage. It is believed that the processed product has very short chain lengths which leads to avoidance of undesirable stringiness while retaining dietary fiber properties and some viscosity building characteristics.

In the following Examples all parts are by weight except where otherwise stated. Ash is determined as set forth in The Food Chemical Codex 3d Ed (1981) P466, incorporated herein by reference.

EXAMPLE 1

A. About 500 grams of Uniguar 80 (Rhone Poulenc Food Ingredients) native guar of initial viscosity 3075 cps (Brookfield RVF, spindle 3, 20 rpm, 25° C.) and 20 ml water was placed into a Cuisinart food processor, fitted with a regular steel cutting blade to a level of about ⅓ full and while the mixer was operating continuously, a volume of water (Control A) or 2N HCl (see Table I below) was added gradually at a rate of about 5 ml/minute. Following completion of addition, product which collected on the sides and bottom of the container was scraped into the main mass, and the whole mixed for another 10 to 15 seconds before collecting the product. The product was heated for one hour at 90° C. in a convection oven and then characterized.

The viscosity of a 1% aqueous solution of samples of the processed material after hydration for 4 hours, the moisture level, pH and the ash are set forth in Table I.

TABLE I

| EXPERIMENT | VISCOSITY (cps) | pH | MOISTURE (%) | ASH (%) |
|---|---|---|---|---|
| A 20 mL water | 2477 | 5.38 | 9.2 | 0.76 |
| B 10 mL HCl | 2698 | 6.23 | 11 | 0.69 |
| C 20 mL HCl | 1637 | 4.75 | 11.4 | 0.53 |
| D 35 mL HCl | 669 | 4.36 | 14 | 0.55 |

B. Additional samples of A, B, C and D were then allowed to hydrate at 1% concentration by weight in water under ambient conditions over two hours. The viscosity of the solutions were measured at 15 minutes, 30 minutes, 60 minutes and 120 minutes. The results, plotting hydration time vs. viscosity are set forth in FIG. 1. The viscosity profile generally provided an envelope of curves with similar viscosity development from a base line of lower viscosity for higher level of acid treatment.

C. Unigar 80 was treated as in Sample D except that heating times at 90° C. were varied to study the effect on final product. Product was treated with 35 ml 2n NaOH to neutralize before performing the indicated tests. The results for samples heated for 60 minutes, 120 minutes and 180 minutes, are set forth in Table II together with comparative properties of unprocessed guar products.

TABLE II

| EXPERIMENT | VISCOSITY (cps) | pH | MOISTURE (%) | ASH (%) |
|---|---|---|---|---|
| E  60 min heating | 825 | 5.45 | 17.2 | 0.67 |
| F 120 min heating | 275 | 5.28 | 17 | 0.62 |
| G 180 min heating | 50 | 5.25 | 15 | 0.75 |
| Uniguar 80 | 3075 | 5.05 | 10.8 | 0.52 |

As the above results indicate, increasing the heating period progressively decreases viscosity.

EXAMPLE II

Uniguar 80 was processed in a similar manner to Example I, except that the acid component was 35 ml 2N HCL in 80% ethanol.

Aliguots of resulting material were heated at 90° C. in a convection oven for periods of 1, 2 and 3 hours, then neutralized under mixing conditions with an equivalent amount of caustic (NaOH) in 75% ethanol. The results are set forth in Table III in comparison to unprocessed and processed commercial guar products. The tests were conducted as set forth in Example I. The viscosity was determined after 4 hours of hydration.

TABLE III

| EXPERIMENT | VISCOSITY (cps) | pH | MOISTURE (%) | ASH (%) |
|---|---|---|---|---|
| H (1 h. heating) | 775 | 5.59 | 8.8 | 0.80 |
| I (2 h. heating) | 150 | 5.06 | 6.8 | 0.79 |
| J (3 h. heating) | no visc | — | — | — |
| K Uniguar 80 | 3075 | 5.05 | 10.8 | 0.52 |

The sample heat treated for three hours had essentially no viscosity in water and was not further tested. The remaining samples showed reduced viscosity and acceptable ash levels.

EXAMPLE III

A. 100 g of Dycol 4000 FC available from Rhone Poulenc Food Ingredients and having a viscosity of 4110 cps (Brookfield RVF, Spindle 3, 20 rpm, 25°) was processed as set forth in Example I except that 7 ml of various concentrations of HCL in 80% ethanol were utilized, ranging from 0.5N to 2.0N. Each of the samples was then heated in a 90° C. oven for 15 minutes. Viscosity values after hydration at 1% for 2 hours are set forth in Table IV. Viscosity results for untreated and similarly treated Uniguar 80 with 2N HCL is given for comparative purposes.

TABLE IV

| CONC. HCl (N) | VISCOSITY DYCOL 4000 FC (cps) | VISCOSITY UNIGUAR 80 (cps) |
| --- | --- | --- |
| 2 | 100 | 775 |
| 1 | 2225 | — |
| 0.5 | 3460 | — |
| 0 | 4110 | 3075 |

B. In the same manner four, 100 g portions of Dycol 4000 FC were processed each with 7 ml of 1N HCl in 80% ethanol, incubated at 90° C. for 75 minutes in a convection oven and neutralized in the processor with 11 ml of 1N NaOH in 80% ethanol. These samples were dried for 5 days at 21° C. and analyzed. The results are set forth in Table V as follows:

TABLE V

| SAMPLE | VISCOSITY (cps) | pH | MOISTURE (%) | ASH (%) |
| --- | --- | --- | --- | --- |
| Sample 1 | 925 | 6.50 | 8.4 | 0.76 |
| Sample 2 | 1025 | 6.58 | 8.0 | 0.71 |
| Sample 3 | 1200 | 6.60 | 7.8 | 0.72 |
| Sample 4 | 1375 | 6.71 | 8.6 | 0.73 |
| Dycol 4000 FC | 4225 | 5.58 | 9.2 | 0.49 |

The viscosity variance (925–1375 cps) is believed to be due to the lag time at temperatures above ambient before the neutralization step occurred. Ash levels are all within acceptable limits.

We claim:

1. A method for processing particulate guar gum to a reduced viscosity from the viscosity of the guar gum being processed thereby providing a product having an ash content equal to or less than 1.5% by weight of the guar and which when dried, then redispersed in ambient water at 1 percent concentration, will evidence a selected initial viscosity of from 0 to 2500 centipose comprising the steps of:

treating particulate guar gum with an incrementally introduced hydrolyzingly effective amount of an aqueous acid or aqueous acid containing non-toxic straight chain or branched $C_1$ to $C_4$ alcohol under high shearing conditions of from about 1,000 to 10,000 $sec^{-1}$ wherein the moisture content of the guar during said aqueous acid treatment is not in excess of 25%;

heating the aqueous acid-treated guar at a temperature of from 30 to 180° C. for a period sufficient to reduce the viscosity of the guar gum; and optionally, neutralizing the aqueous acid-treated product.

2. A process for producing a viscous aqueous solution comprising water and a guar having an ash content equal to or less than 1.5% wt of the guar, the process comprising producing a guar in accordance with the method of claim 1 and hydrating the guar in water.

3. A process for producing a food composition of enhanced textural qualities comprising at least one edible food having a pourable or spreadable consistency and a guar having an ash content equal to or less than 1.5% wt of the guar, the process comprising producing a guar in accordance with the method of claim 1 and adding the guar to the at least one edible food.

4. A process according to claim 3 wherein the edible food is a viscous, creamy or frozen food product having a uniform, smooth, textural mouthfeel.

5. A process according to claim 1 wherein the resulting guar has a molecular weight of 20,000 to 500,000; a particle size of 20 to 400 mesh; and a viscosity in dispersed 1% aqueous solution in the range of 0 to 1500 cps.

6. A method for preparing a reduced viscosity guar having an ash content equal to or less than 1.5% by weight of the guar which when dried, then redispersed in ambient water at 1 percent concentration, will evidence a selected initial viscosity of from 0 to 2500 centipose comprising the steps of:

1) producing an admixture by incrementally introducing a hydrolyzingly effective amount of either an aqueous or aqueous alcoholic acid solution to particulate guar under 1,000 to 10,000 $sec^{-1}$ high shear conditions in a mixing zone in an amount and rate insufficient to cause clumping or the formation of gumming of the particles in the admixture, and, to avoid undesirable formation of ash, and wherein the moisture content of the guar during treatment is not in excess of 25%;

2) heating the resulting aqueous acid treated, sheared admixture to a temperature of between 30 and 180° C. from one minute to about 3 hours to effect at least partial depolymerization of the guar;

3) incrementally introducing an alkaline solution to the partially depolymerized guar under conditions of intimate mixing to provide an essentially neutralized product relative to the acid supplied in the first step; and 4) optionally, removing the moisture therefrom.

7. The method of claim 6, wherein the acid is added incrementally to the particulate guar in the presence of 1 to 15 parts by weight of water per 100 parts of guar.

8. The method of claim 7 wherein 1 to 15 parts by weight of 0.1 to 3N acid is added gradually to 100 parts by weight of guar at a rate of between about 1 and 15 parts acid per minute.

9. The method of claim 6 wherein the guar has a particle size of between about 20 and 400 mesh.

10. The method of claim 9 wherein 80% of the guar has a particle size within the range of 80 and 200 mesh.

11. A process for producing a viscous aqueous solution comprising water and a guar having an ash content equal to or less than 1.5% wt of the guar, the process comprising producing a guar in accordance with the method of claim 6 and hydrating the guar in water.

12. A process for producing a food composition of enhanced textural qualities comprising at least one edible food having a pourable or spreadable consistency and a guar having an ash content equal to or less than 1.5% wt of the guar, the process comprising producing a guar in accordance with the method of claim 6 and adding the guar to the at least one edible food.

13. A process according to claim 12, wherein the edible food is a viscous, creamy or frozen food product having a uniform, smooth, textural mouthfeel.

14. A process according to claim 6 wherein the resulting guar has a molecular weight of 20,000 to 500,000; a particle size of 20 to 400 mesh; and a viscosity in dispersed 1% aqueous solution in the range of 0 to 1500 cps.

* * * * *